(12) United States Patent
Sasaki et al.

(10) Patent No.: US 7,983,121 B2
(45) Date of Patent: Jul. 19, 2011

(54) OPTICAL AXIS SHIFT CORRECTING DEVICE AND METHOD, AND COMPUTER PROGRAM

(75) Inventors: Yoshio Sasaki, Saitama (JP); Kenichi Oono, Saitama (JP); Yasushi Oshima, Saitama (JP)

(73) Assignee: Pioneer Corporation, Tokyo (JP)

(*) Notice: Subject to any disclaimer, the term of this patent is extended or adjusted under 35 U.S.C. 154(b) by 500 days.

(21) Appl. No.: 12/093,536

(22) PCT Filed: Nov. 15, 2006

(86) PCT No.: PCT/JP2006/322755
§ 371 (c)(1),
(2), (4) Date: May 23, 2008

(87) PCT Pub. No.: WO2007/058208
PCT Pub. Date: May 24, 2007

(65) Prior Publication Data
US 2009/0097367 A1    Apr. 16, 2009

(30) Foreign Application Priority Data

Nov. 15, 2005 (JP) ................................. 2005-330777

(51) Int. Cl.
*G11B 7/00* (2006.01)
(52) U.S. Cl. .................. 369/44.32; 369/53.34; 369/53.2
(58) Field of Classification Search .................. None
See application file for complete search history.

(56) References Cited

U.S. PATENT DOCUMENTS

| 5,612,939 A | 3/1997 | Ueki et al. |
| 5,682,372 A * | 10/1997 | Yamakawa et al. ............. 369/94 |
| 5,808,989 A | 9/1998 | Ueki et al. |

FOREIGN PATENT DOCUMENTS

| JP | 8 203107 | 8/1996 |
| JP | 11-025473 | 1/1999 |
| JP | 2000-149295 | 5/2000 |
| JP | 2005-129178 | 5/2005 |

* cited by examiner

*Primary Examiner* — Van N Chow
(74) *Attorney, Agent, or Firm* — Young & Thompson

(57) ABSTRACT

An optical axis shift correcting device is provided in an optical information device including an irradiation element for applying a laser, an optical system for guiding a laser applied to an optical disc having a recording track, and a light reception element for receiving the light from the optical disc generated by the guided laser via the optical system. The optical axis shift correcting device includes a jitter acquisition element, an optical axis modification element modifying the direction of the optical axis with respect to the light reception element, and a control element controlling the optical axis modification element to reduce the shift when the acquired jitter amount exceeds a predetermined threshold value. The optical axis shift correcting device thus corrects the optical axis light shift on the surface of the light reception element with respect to the radial direction of the optical disc set in the optical information device.

12 Claims, 7 Drawing Sheets

[FIG.1]
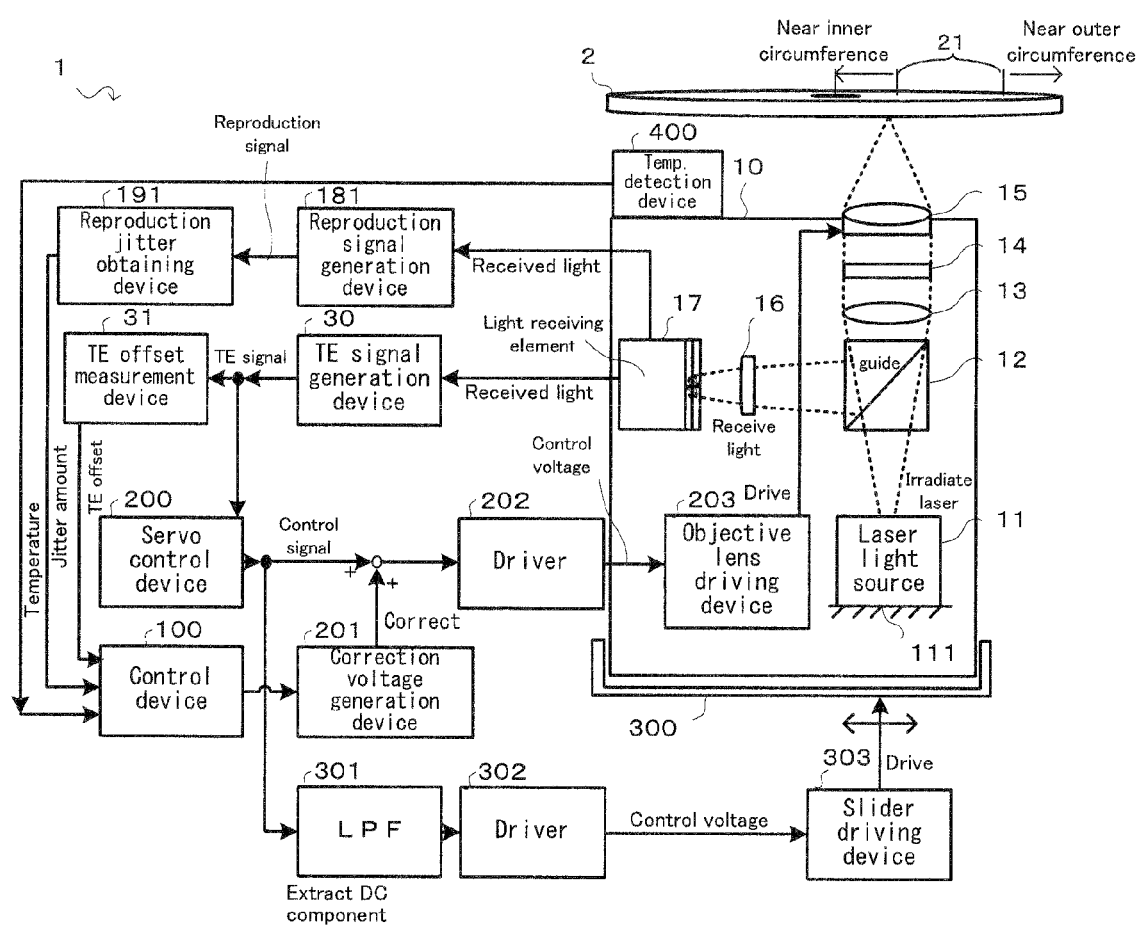

[FIG. 2]
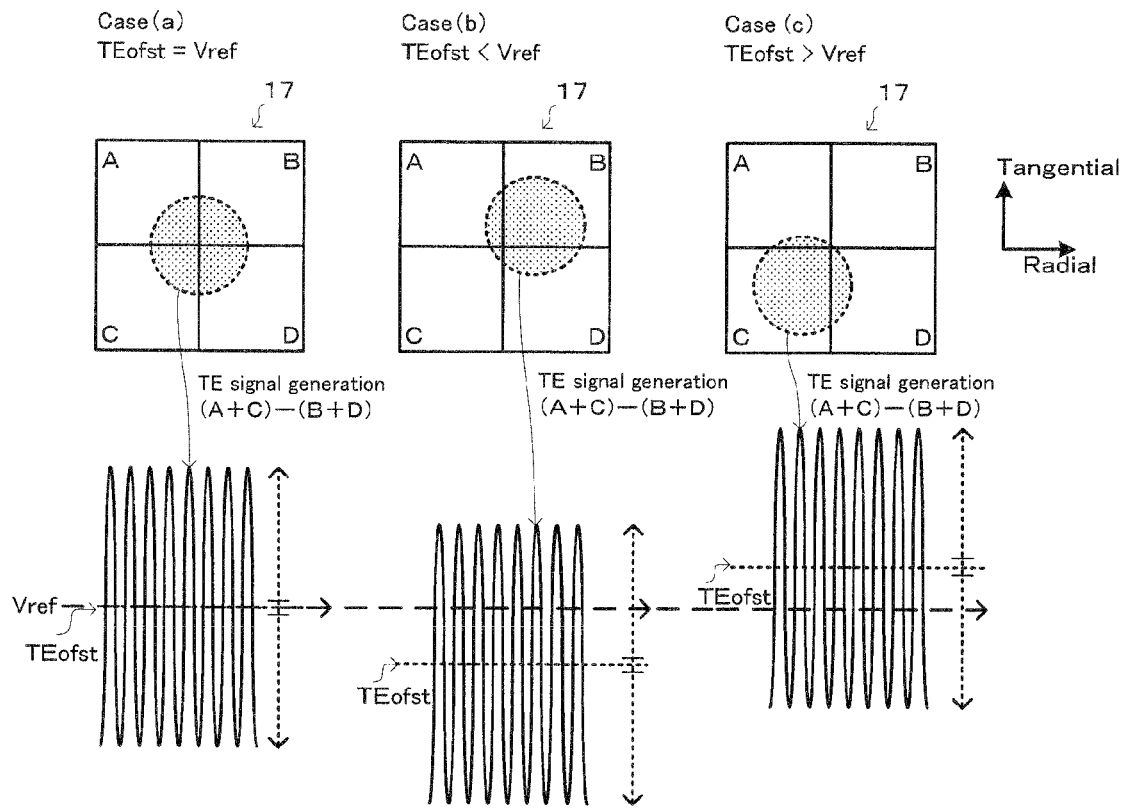
[FIG. 3]
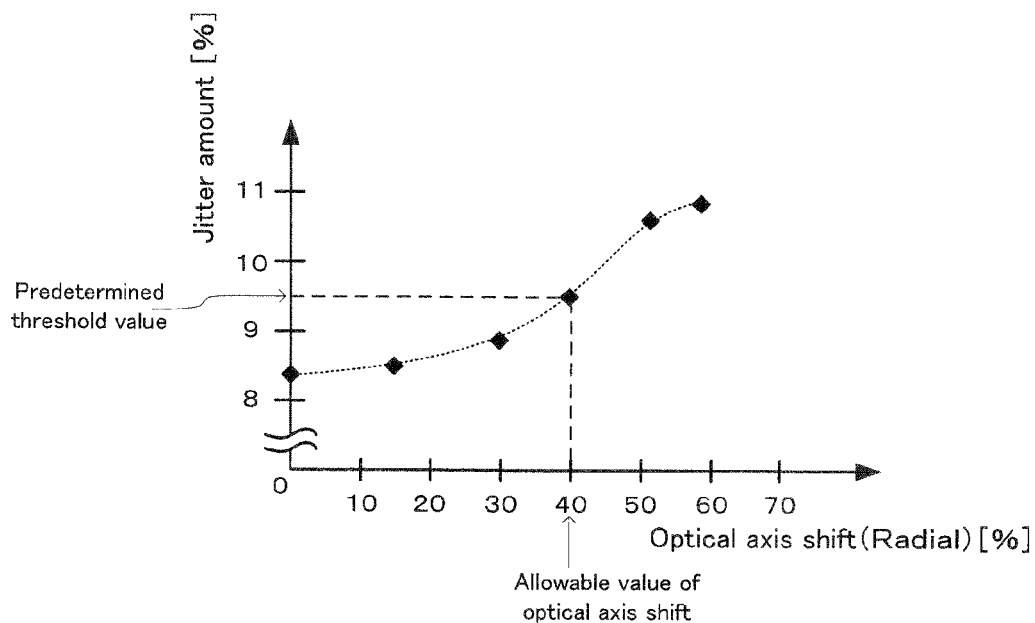

[FIG. 4]
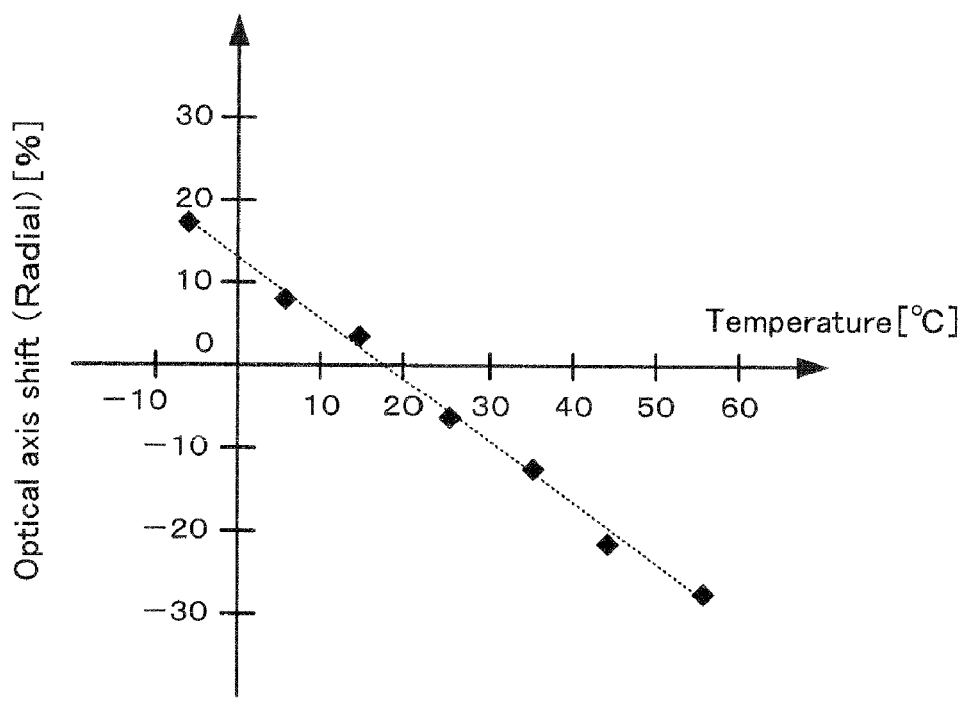

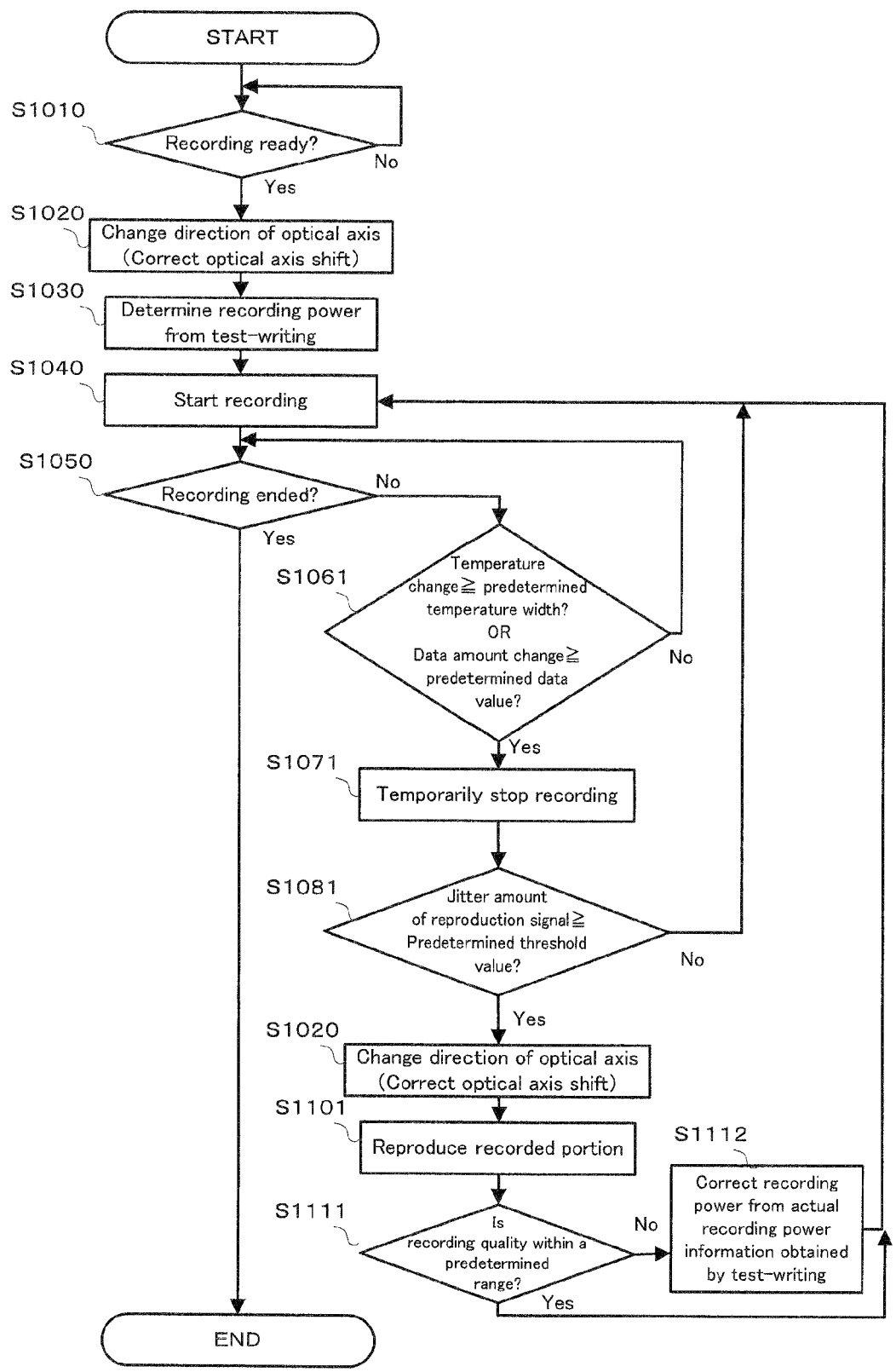
[FIG. 5]

[FIG. 6]
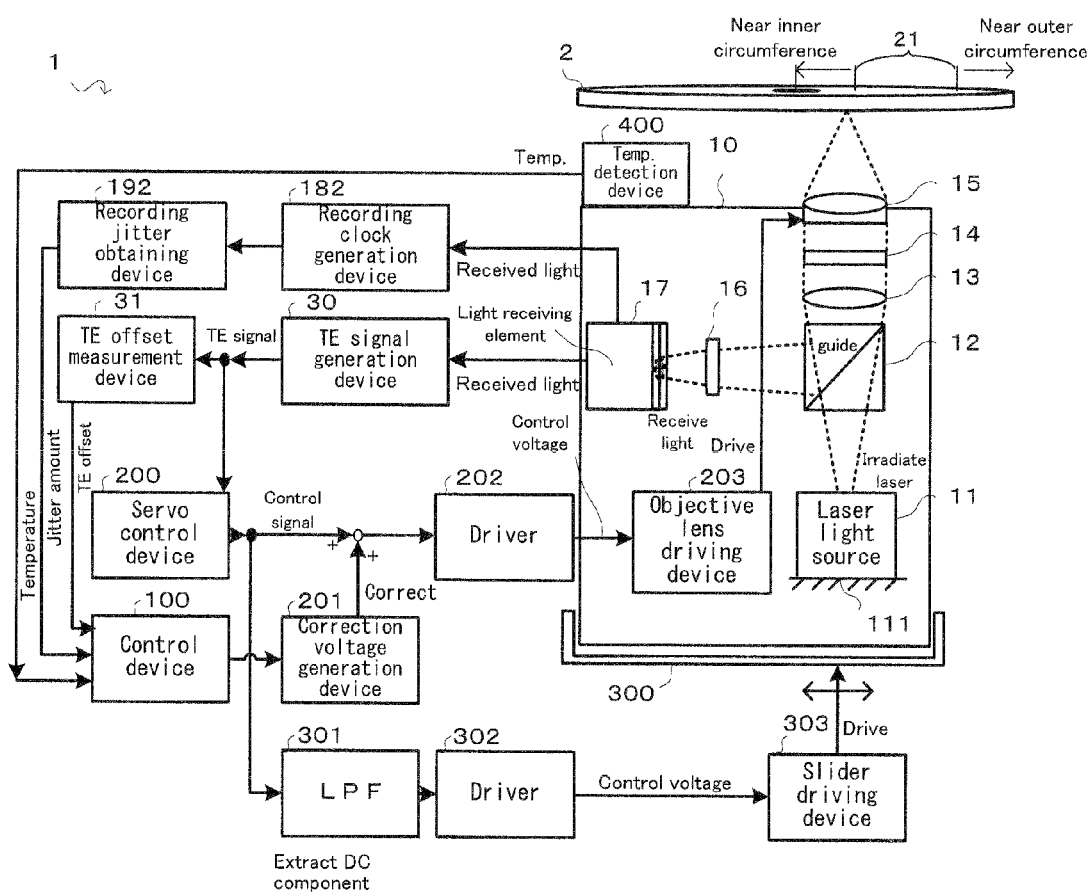

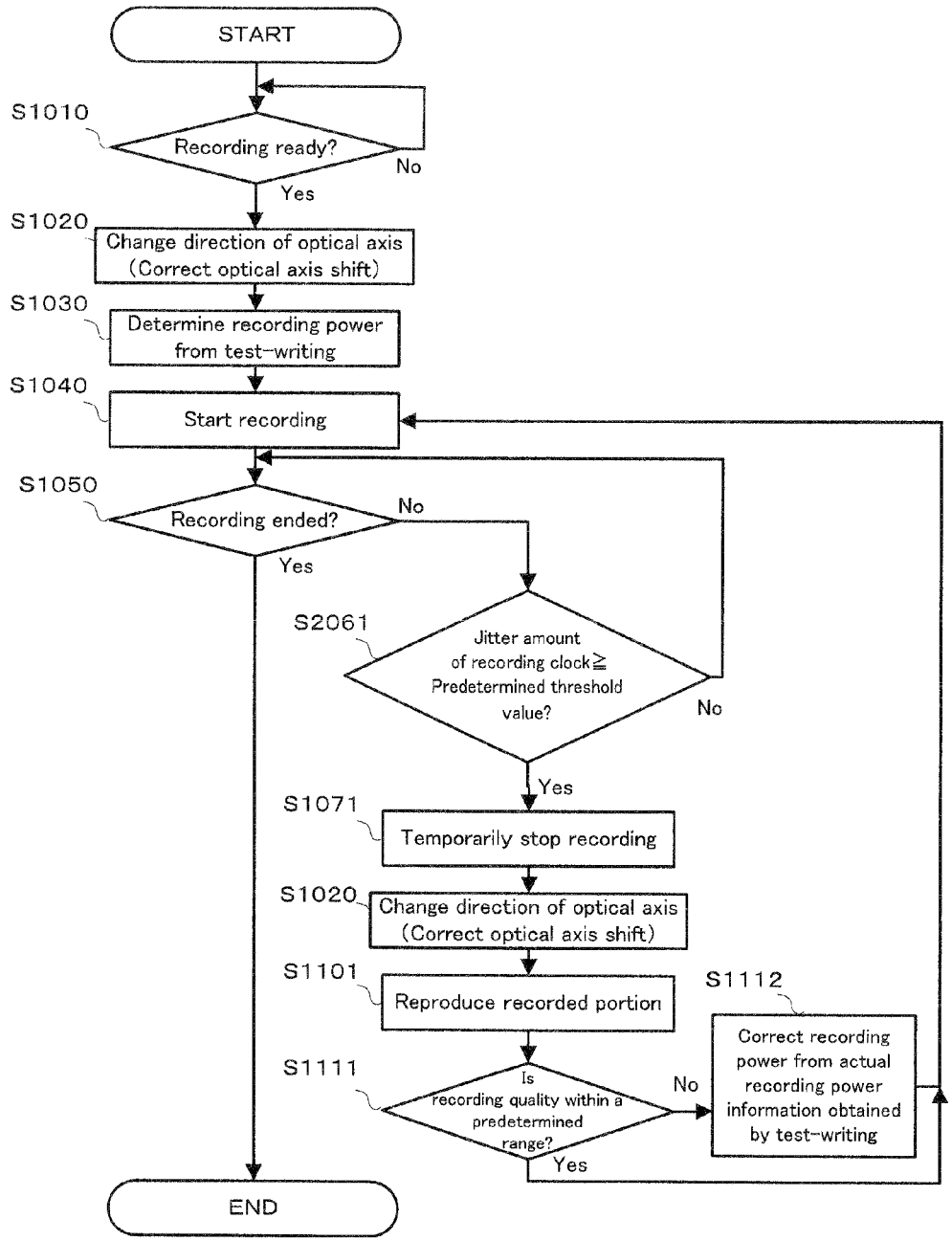

[FIG. 8]
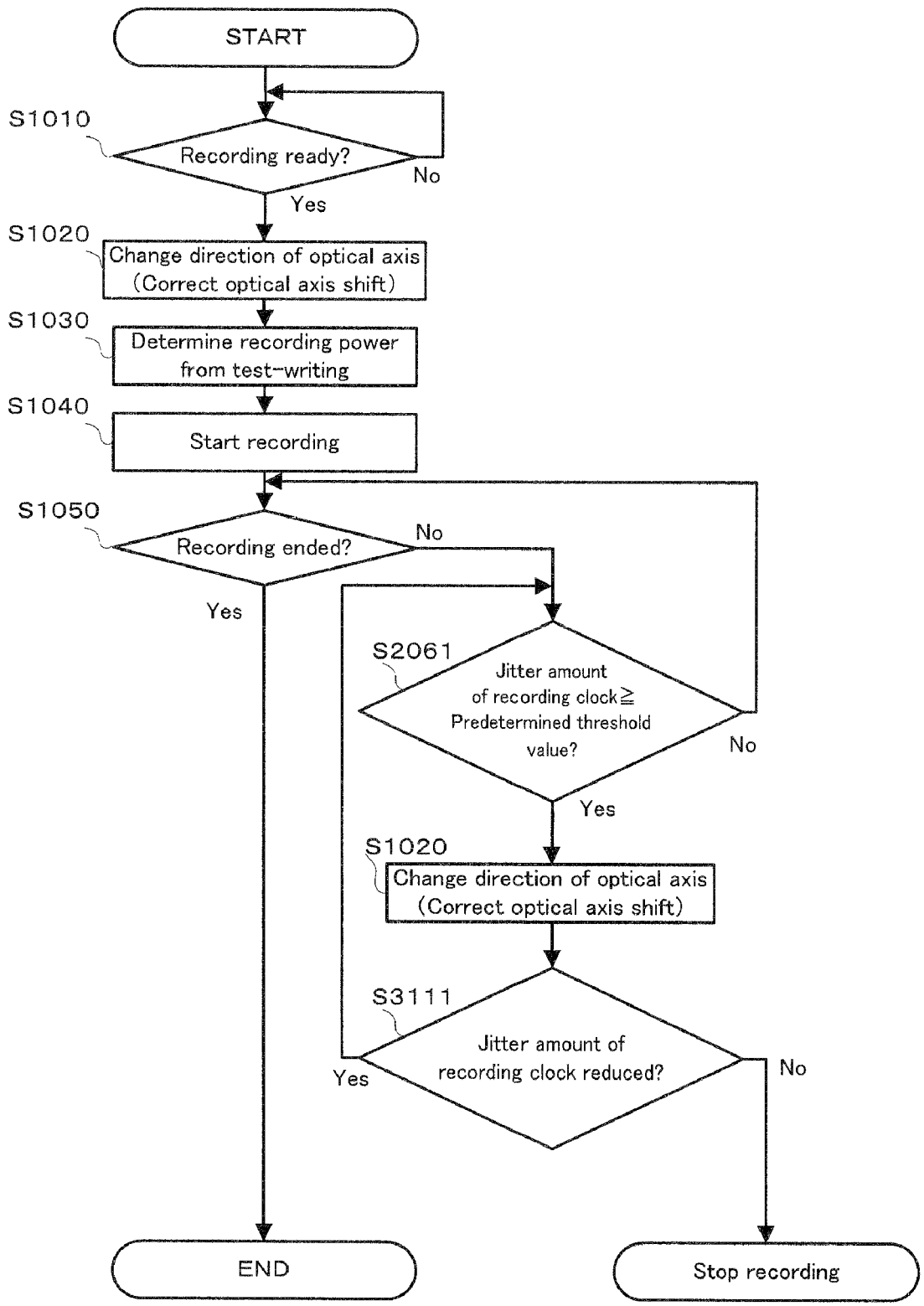

OPTICAL AXIS SHIFT CORRECTING DEVICE AND METHOD, AND COMPUTER PROGRAM

TECHNICAL FIELD

The present invention relates to an optical axis shift correcting apparatus and method, which is provided for an optical information apparatus, such as a DVD recorder, and which corrects a shift or misalignment in the optical axis of a laser beam in the radial direction of an optical disc, and a computer program which makes a computer function as such an optical axis shift correcting apparatus.

BACKGROUND ART

Under the current environment that a conventional optical disc (e.g. a CD (Compact Disc), a DVD) and a next-generation optical disc (e.g. a Blu-ray Disc: BD) are mixed, it is required to provide compatibility for recording and reproduction of each optical disc. However, in order to realize an optical pickup apparatus that has the compatibility, an optical axis shift can be an issue.

In order to deal with such a trouble, for example, an optical axis correction technology has been suggested (refer to a patent document 1). According to this technology, an objective lens is displaced in the radial direction of an optical disc so as to maximize the amplitude of an information signal (i.e. RF signal) recorded on the optical disc.

Patent document 1: Japanese Patent Application Laid Open NO. Hei 11-25473

DISCLOSURE OF INVENTION

Subject to be Solved by the Invention

However, for example, according to the technology disclosed in the aforementioned patent document 1, since an offset is adjusted by using the information signal, there is such a technical problem that information needs to be already recorded on a recording type disc.

Moreover, even after the optical axis is once adjusted, the optical axis is easily influenced by a temperature change, which is also a problem. In particular, this is significant because an adhesive, which is easily influenced by the temperature change, is used for the installation and the positioning of a plurality of optical parts used on the optical pickup apparatus that has the compatibility described above, as occasion demands. Moreover, even if the adhesive is not used or in a position in which the adhesive is not used, the temperature change causes a change in a positional relationship between the optical parts to a greater or lesser degree, or it causes distortion or expansion and contraction in each optical part. Thus, the influence of the temperature change cannot be ignored in some cases.

In view of the aforementioned problem, it is therefore an object of the present invention to provide an optical axis shift correcting apparatus and method which can selectively correct a shift in the optical axis of a laser beam in the radial direction of an optical disc, in relatively simple processes, and a computer program which makes a computer function as such an optical axis shift correcting apparatus.

Means for Solving the Subject (Optical Axis Shift Correcting Apparatus)

The above object of the present invention can be achieved by a first optical axis shift correcting apparatus for correcting a shift of an optical axis of light on a surface of a light receiving element with respect to a radial direction of an optical disc set on an optical information apparatus provided with: an irradiating device for irradiating a laser beam; an optical system for guiding the irradiated laser beam to the optical disc with a recording track; and the light receiving element for receiving, through the optical system, the light from the optical disc caused by the guided laser beam, the optical axis shift correcting apparatus provided with: a jitter obtaining device for obtaining a jitter amount of a signal obtained on the basis of the received light; an optical axis changing device for changing a direction of the optical axis with respect to the light receiving element; and a controlling device for controlling the optical axis changing device to reduce the shift if the obtained jitter amount exceeds a predetermined threshold value.

According to the present invention, in the reproduction and the recording on the optical information apparatus, such as a DVD recorder and a DVD player, the optical axis shift is corrected as follows.

Firstly, before or in the middle of an actual information reproduction operation or recording operation, for example, the jitter obtaining device provided with a controller or the like obtains the jitter amount of the signal obtained on the basis of the received light.

Here, according to the study of the present inventors, it is confirmed that the signal obtained on the basis of the received light oscillates with the jitter amount corresponding to the shift amount when there is a shift in the optical axis on the surface of the light receiving element, in other words, when the position of a light spot (i.e. the position in a direction corresponding to the radial direction of the optical disc) formed on the surface of the light receiving element deviates from a scheduled position. Based on this study, it can be also considered that the shift amount can be estimated from the jitter amount, in reverse. Thus, the shift amount is estimated from the jitter amount, by which it is possible to judge whether or not it is necessary to correct the optical axis shift at the time point that the jitter amount is obtained. Incidentally, the signal obtained on the basis of the received light is, for example, a reproduction signal or a recording clock. That is, the shift amount is estimated by that the jitter obtaining device obtains the jitter amount of the reproduction signal or the recording clock. In particular, the recording clock is obtained without stopping the recording, so it is effective to obtain the jitter amount of the recording clock. That is, as a method in which the jitter obtaining device of the present invention obtains the jitter amount in the middle of the reproduction operation and the recording operation, it includes both a method of obtaining the jitter amount with temporarily stopping the operation and a method of obtaining with performing the operation.

Then, if the obtained jitter amount exceeds the predetermined threshold value (i.e. if it is judged that it is necessary to correct the optical axis shift at the time point that the jitter value is obtained), the controlling device controls the optical axis changing device to reduce the optical axis shift. Here, the expression that " . . . exceeds the predetermined threshold value" may mean being greater than the predetermined threshold value, or may mean being greater than or equal to the predetermined threshold value. By the control by the optical axis changing device, the direction of the optical axis with respect to the light receiving element is changed to reduce the shift. Then, the shift is reduced in a feedback manner or in a feed-forward manner. That is, the optical axis shift is corrected. Incidentally, such a predetermined threshold value may be determined in advance for each type or each individual of the optical information apparatus so as to satisfy performances and apparatus specification required for the actual optical information apparatus, by obtaining in advance a relationship between the shift amount of the optical axis and the jitter amount of the signal obtained on the basis of the received light, experimentally, experientially, or by simulations or the like. Moreover, such a predetermined threshold value may be changed while using or checking the optical information apparatus. Moreover, as a unit which constitutes the optical axis changing device, such as an actuator for actually changing the optical axis, it is possible to divert from a driving mechanism, such as an actuator and a motor, owned by the optical information apparatus, like a slider motor for performing slider servo, an actuator used in performing tracking servo, and the like, which are disposed in an optical pickup. Alternatively, it is possible to prepare an actuator for exclusive use or the like. Moreover, if the optical axis is changed in this manner, the tracking servo may be set in an open state. Moreover, specifically, the optical axis shift may be detected on the basis of an offset amount of a tracking error signal. By detecting the optical axis shift in this manner, the optical axis shift is corrected without a need to use the information that has been already recorded on the optical disc. Therefore, it is possible to correct the optical axis shift before the recording by the optical information apparatus or in similar cases.

Consequently, it is possible to selectively correct the shift of the optical axis of the light on the surface of the light receiving element with respect to the radial direction of the optical disc, by the relatively simple control of obtaining the jitter amount of the signal obtained on the basis of the received light. For example, if the such correction is performed accordingly when the jitter amount is greater than or equal to the predetermined threshold value, regularly or irregularly in the middle of the reproduction or the recording, it is possible to continue the reproduction and the recording in the state that there is no shift in the optical axis in the radial direction of the optical axis. Incidentally, it is more effective if such correction is performed not only when the jitter amount is greater than or equal to the predetermined threshold value but also when there is a change in an environment, such as a temperature, to the extent that the state of the optical system changes.

In another aspect of the first optical axis shift correcting apparatus of the present invention, the signal obtained on the basis of the received light is a reproduction signal obtained by reproducing information recorded on the optical disc, and the controlling device controls the optical axis changing device to reduce the shift if the jitter amount related to the obtained reproduction signal exceeds the predetermined threshold value.

According to this aspect, in the reproduction, or in the confirmation of the recording quality with stopping the recording, the information recorded on the optical disc is reproduced to obtain the reproduction signal.

According to the study of the present inventors, it is confirmed that the signal obtained in this manner oscillates with the jitter amount corresponding to the shift amount when there is a shift in the optical axis on the surface of the light receiving element.

Thus, the jitter obtaining device obtains the jitter amount from the obtained reproduction signal. Then, the controlling device can judge whether or not it is necessary to correct the optical axis shift in accordance with whether or not the jitter amount of the obtained reproduction signal exceeds the predetermined threshold value (e.g. 10%). For example, if the jitter amount of the obtained reproduction signal is greater than or equal to the predetermined threshold value, it is predicted that the shift amount of the optical axis is to the extent that it cannot be ignored. Thus, the controlling device controls the optical axis changing device to reduce the shift of the optical axis. On the other hand, if the jitter amount of the obtained reproduction signal is not greater than or equal to the predetermined threshold value, it is considered that the shift amount of the optical axis can be ignored in practice, so that the shift is not corrected.

Consequently, it is possible to selectively correct the shift of the optical axis of the light on the surface of the light receiving element with respect to the radial direction of the optical disc, by the relatively simple control of obtaining the jitter amount of the reproduction signal.

In another aspect of the first optical axis shift correcting apparatus of the present invention, the signal obtained on the basis of the received light is a recording clock used for the recording with respect to the optical disc, and the controlling device controls the optical axis changing device to reduce the shift if the jitter amount related to the obtained recording clock exceeds the predetermined threshold value.

According to this aspect, for example, in the recording of the optical information apparatus, the recording clock used for the recording is obtained.

According to the study of the present inventors, it is confirmed that the recording clock obtained in this manner oscillates with the jitter amount corresponding to the shift amount when there is a shift in the optical axis on the surface of the light receiving element.

Thus, the jitter obtaining device obtains the jitter amount from the obtained recording clock. Then, the controlling device can judge whether or not it is necessary to correct the optical axis shift, in accordance with whether or not the jitter amount of the obtained recording clock exceeds the predetermined threshold value (e.g. a value corresponding to a jitter amount 9% of the reproduction signal). For example, if the jitter amount of the obtained recording clock is greater than or equal to the predetermined threshold value, it is predicted that the shift amount of the optical axis is to the extent that it cannot be ignored. Thus, the controlling device controls the optical axis changing device to reduce the shift of the optical axis. On the other hand, if the jitter amount of the obtained recording clock is not greater than or equal to the predetermined threshold value, it is considered that the shift amount of the optical axis can be ignored in practice, so that the shift is not corrected.

Consequently, it is possible to selectively correct the shift of the optical axis of the light on the surface of the light receiving element with respect to the radial direction of the optical disc, by the relatively simple control of obtaining the jitter amount of the recording clock.

In this aspect, the controlling device may control the optical axis changing device to reduce the shift without stopping the recording if the jitter amount related to the obtained recording clock exceeds the predetermined threshold value.

By virtue of such construction, the recording clock can be obtained in the middle of the recording. As a result, it is possible to selectively correct the shift of the optical axis of the light on the surface of the light receiving element with respect to the radial direction of the optical disc, without stopping the recording. In particular, without stopping the recording, the optical axis shift is corrected in a feedback manner, on the basis of the jitter amount of the obtained recording clock.

Incidentally, in this aspect it needs to be careful because the optical axis changing device is controlled without stopping the recording. Specifically, it is desirable that the predetermined threshold value of the jitter amount of the recording clock, which is used as a threshold value for judging whether or not to control the optical axis changing device, is lower when the recording is stopped than when the recording is not stopped. For example, if the jitter amount of the recording clock when the recording is not stopped corresponds to a jitter amount 10% of the reproduction signal, the jitter amount when the recording is stopped may correspond to a jitter amount 9% of the reproduction signal.

In another aspect of the first optical axis shift correcting apparatus of the present invention, the optical information apparatus is further provided with a tracking error signal generating device for generating a tracking error signal related to the recording track, on the basis of the received light, the optical axis shift correcting apparatus is further provided with a shift detecting device for detecting the shift on the basis of an offset amount of the tracking error signal, and the controlling device controls the optical axis changing device to reduce the detected shift.

According to this aspect, the optical information apparatus is further provided with the tracking error signal generating device for generating the tracking error signal related to the recording track, on the basis of the received light. For example, in case of a four-divisional light receiving element, the tracking error signal is generated as a push-pull signal.

In the reproduction or the recording of the optical information apparatus, before or in the middle of the actual information reproduction operation or recording operation, the shift of the optical axis of the light on the surface of the light receiving element with respect to the radial direction of the set or loaded optical disc is detected by the shift detecting device provided with a controller or the like, on the basis of the offset amount of the tracking error signal.

According to the study of the present inventors, it is confirmed that the tracking error signal is offset with the offset amount according to the shift amount when there is a shift in the optical axis on the surface of the light receiving element, in other words, when the position of a light spot (i.e. the position in a direction corresponding to the radial direction of the optical disc) formed on the surface of the light receiving element deviates from a scheduled position. At this time, it is known that if there are a plurality of light sources in order to correspond to a plurality of types of optical discs, or if the type of the laser beam reaching to the optical disc surface is changed, there is a possibility that the optical axis deviates to the extent that it cannot be ignored, because of factors in a manufacturing process, a change over time, and a temperature change, in accordance with the change of the type of the laser beam. For example, even displacing an objective lens in the normal direction of the optical disc provides the shift in the optical axis. In particular, although the offset of the tracking error signal can be caused by another factor, such as coma aberration of the optical disc and electric offset, such a factor is relatively small or can be set relatively small, so that the optical axis shift of the light as described above is dominant as the factor of the offset of the tracking error signal. Therefore, it is possible to detect the shift of the optical axis on the surface of the light receiving element, from the offset of the tracking error signal.

Then, if the obtained jitter amount exceeds the predetermined threshold value (i.e. if it is judged that it is necessary to correct the optical axis shift at the time point that the jitter amount is obtained), the controlling device controls the optical axis changing device provided with e.g. a controller, an actuator, or the like, to reduce the optical axis shift. That is, the direction of the optical axis with respect to the light receiving element is changed to reduce the optical axis shift. Then, the shift is reduced in a feedback manner or in feed-forward manner. That is, the optical axis shift is corrected.

As a result, it is possible to correct the shift of the optical axis of the light on the surface of the light receiving element, with respect to the radial direction of the optical disc, without a need to use the information that has been already recorded on the optical disc. Therefore, it is possible to selectively correct the optical axis shift before the recording.

In this aspect, the controlling device may control the optical axis changing device to reduce the detected shift before the recording with respect to the optical disc.

By virtue of such construction, it is possible to improve the recording quality from the beginning of the recording. Moreover, if the optical axis shift is corrected accordingly before test-writing or before power correction, it is possible to improve the recording quality in a comprehensive manner.

In another aspect of the first optical axis shift correcting apparatus of the present invention, the optical axis shift correcting apparatus is further provided with a temperature detecting device for detecting a temperature of the optical system, and the controlling device controls the optical axis changing device to reduce the shift if the detected temperature changes by a predetermined temperature width or more.

In the optical system, the optical axis shift easily occurs with respect to the temperature change. According to this aspect, it is possible to correct the shift of the optical axis caused by the temperature change on a timely basis. In particular, if a laser light source is fixed in the irradiating device with an adhesive, the shift of the optical axis by the temperature change stands out, so that this aspect is extremely effective. Incidentally, such a predetermined temperature width may be determined in advance for each type or each individual of the optical information apparatus so as to satisfy performances and apparatus specification required for the actual optical information apparatus, by obtaining in advance a relationship between the temperature change and the shift of the optical axis, experimentally, experientially, or by simulations or the like. Moreover, such a predetermined threshold value may be changed while using or checking the optical information apparatus. Moreover, in the same optical system the shift of the optical axis and the temperature change or the like may be in a reversible relationship in some cases. For example, in some cases the shift amount of the optical axis is −30% when the temperature increases from 30 to 50 degrees Celsius. On the other hand, in some cases the shift amount of the optical axis is nearly +30% when the temperature reduces from 50 to 30 degrees Celsius. By using this, the controlling device can estimate the shift amount of the optical axis when the temperature reduces, using the shift amount of the optical axis when the temperature increases, and can correct the shift.

In another aspect of the first optical axis shift correcting apparatus of the present invention, the optical axis shift correcting apparatus is further provided with a recording amount detecting device for detecting a data amount of record data written onto the optical disc in the recording with respect to the optical disc, and the controlling device controls the optical axis changing device to reduce the shift if the detected data amount is written by a predetermined data width or more.

Typically, it is considered that the temperature increases with an increase in the data amount of the record data written onto the optical disc. Moreover, as described above, the increase in temperature causes the shift of the optical axis. Therefore, it can be said that the shift of the optical axis increases with the increase in the detected data amount.

Therefore, in the recording, if the record data is written by the data amount or more, which can cause the temperature change of the predetermined temperature width or more, the optical axis changing device is controlled to reduce the shift. In this manner, it is possible to indirectly obtain the temperature change from the change in the data amount of the record data written by the predetermined data width, and to correct the shift of the optical axis caused by the temperature change on a timely basis.

In another aspect of the first optical axis shift correcting apparatus of the present invention, the optical information apparatus is further provided with a test-writing device for controlling the irradiating device to irradiate the laser beam as test-writing on the optical disc before the recording with respect to the optical disc, for obtaining a result of the test-writing as actual recording power information, and for determining a recording power of the irradiated laser beam on the basis of the obtained actual recording power information, and the controlling device corrects the determined recording power on the basis of the obtained actual recording power information if recording quality when controlling the optical axis changing device is not within a predetermined range.

By virtue of such construction, if the recording quality is not within the predetermined range despite the correction of the optical axis shift, the recording power of the irradiated laser beam is corrected, so that the recording quality is improved in a comprehensive manner.

Incidentally, the recording quality is quantitatively evaluated by using a recording quality evaluation parameter which is obtained by reproducing the recorded data. Here, the recording quality evaluation parameter includes, for example, asymmetry and degree of modulation, in addition to the jitter amount of the signal obtained on the basis of the received light. Moreover, the actual recording power information includes correspondence information about a correspondence between the recording power obtained by the test-writing and the recording quality evaluation parameter. For example, the actual recording power information includes correspondence information about the recording power and the asymmetry, and correspondence information about the recording power and the degree of modulation (or a rate of change in the degree of modulation).

In this aspect, the controlling device may control the optical axis changing device to reduce the shift before the test-writing.

By virtue of such construction, it is possible to improve the accuracy of the test-writing (i.e. the accuracy of correcting the recording power).

The above object of the present invention can be also achieved by a second optical axis shift correcting apparatus provided for an optical information apparatus provided with: an irradiating device for irradiating a laser beam; an optical system for guiding the irradiated laser beam to an optical disc with a recording track; and a light receiving element for receiving, through the optical system, light from the optical disc caused by the guided laser beam, the optical axis shift correcting apparatus for correcting a shift of an optical axis of the light on a surface of the light receiving element with respect to a radial direction of the optical disc set on the optical information apparatus, the optical axis shift correcting apparatus provided with: a recording feature obtaining device for obtaining a recording feature parameter which indicates a recording feature of a signal obtained on the basis of the received light; an optical axis changing device for changing a direction of the optical axis with respect to the light receiving element; and a controlling device for controlling the optical axis changing device to reduce the shift if the obtained recording feature deviates from a predetermined range.

According to the present invention, in the reproduction and the recording on the optical information apparatus, such as a DVD recorder and a DVD player, the optical axis shift is corrected as follows.

Firstly, before or in the middle of an actual information reproduction operation or recording operation, for example, the recording feature obtaining device provided with a controller or the like obtains the recording feature parameter which indicates the recording feature of the signal obtained on the basis of the received light. Here, the "recording feature parameter" indicates an index which quantitatively represents the recording feature, such as the aforementioned jitter, asymmetry, and degree of modulation.

Then, if the obtained recording feature parameter deviates from the predetermined range (i.e. if it is judged that it is necessary to correct the optical axis shift at the time point that the recording feature is obtained), the controlling device controls the optical axis changing device to reduce the optical axis shift. Here, the expression that " . . . deviates from the predetermined range" may mean being greater than an upper limit value of the predetermined range, may mean being greater than or equal to the upper limit value of the predetermined range, may mean being less than a lower limit value of the predetermined range, or may mean being less than or equal to the lower limit value of the predetermined range. By the control by the optical axis changing device, the direction of the optical axis with respect to the light receiving element is changed to reduce the shift. Then, the shift is reduced in a feedback manner or in a feed-forward manner. That is, the optical axis shift is corrected. Incidentally, such a predetermined range may be determined in advance for each type or each individual of the optical information apparatus so as to satisfy performances and apparatus specification required for the actual optical information apparatus, by obtaining in advance a relationship between the shift amount of the optical axis and the recording feature parameter which indicates the recording feature of the signal obtained on the basis of the received light, experimentally, experientially, or by simulations or the like. Moreover, such a predetermined range may be changed while using or checking the optical information apparatus.

Consequently, it is possible to selectively correct the shift of the optical axis of the light on the surface of the light receiving element with respect to the radial direction of the optical disc, by the relatively simple control of obtaining the recording feature parameter which indicates the recording feature of the signal obtained on the basis of the received light. For example, if the such correction is performed accordingly when the recording feature parameter deviates from the predetermined range, regularly or irregularly in the middle of the reproduction or the recording, it is possible to continue the reproduction and the recording in the state that there is no shift in the optical axis in the radial direction of the optical axis. Incidentally, it is more effective if such correction is performed not only when the recording feature parameter deviates from the predetermined range but also when there is a change in an environment, such as a temperature, to the extent that the state of the optical system changes.

In another aspect of the first or second optical axis shift correcting apparatus of the present invention, the optical information apparatus is further provided with a servo device for performing tracking servo of the laser beam for the recording track, and the controlling device controls the optical axis changing device to reduce the shift in such a state that the tracking servo is open.

According to this aspect, before the correction of the shift of the optical axis, the tracking servo of the laser beam with respect to the recording track is set in an open state by the servo device. After that, the controlling device reduces the shift of the optical axis, so that it is possible to perform the correction highly accurately by the relatively simple control.

(Optical Axis Shift Correcting Method)

The above object of the present invention can be also achieved by an optical axis shift correcting method for correcting a shift of an optical axis of light on a surface of a light receiving element with respect to a radial direction of an optical disc set on an optical information apparatus provided with: an irradiating device for irradiating a laser beam; an optical system for guiding the irradiated laser beam to the optical disc with a recording track; and the light receiving element for receiving, through the optical system, the light from the optical disc caused by the guided laser beam, the optical axis shift correcting method provided with: a jitter obtaining process of obtaining a jitter amount of a signal obtained on the basis of the received light; and an optical axis changing process of changing a direction of the optical axis with respect to the light receiving element to reduce the shift if the obtained jitter amount exceeds a predetermined threshold value.

According to the optical axis shift correcting method of the present invention, as in the aforementioned first or second optical axis shift correcting apparatus of the present invention, it is possible to selectively correct the shift of the optical axis of the light on the surface of the light receiving element with respect to the radial direction of the optical disc, by the relatively simple control.

Incidentally, the optical axis shift correcting method of the present invention can employ the same various aspects as those of the aforementioned first or second optical axis shift correcting apparatus of the present invention.

(Computer Program)

The above object of the present invention can be also achieved by a computer program making a computer function as an optical axis shift correcting apparatus for correcting a shift of an optical axis of light on a surface of a light receiving element with respect to a radial direction of an optical disc set on an optical information apparatus, the computer provided for the optical information apparatus provided with: an irradiating device for irradiating a laser beam; an optical system for guiding the irradiated laser beam to the optical disc with a recording track; and the light receiving element for receiving, through the optical system, the light from the optical disc caused by the guided laser beam, the computer program making the computer function as: a jitter obtaining device for obtaining a jitter amount of a signal obtained on the basis of the received light; an optical axis changing device for changing a direction of the optical axis with respect to the light receiving element; and a controlling device for controlling the optical axis changing device to reduce the shift if the obtained jitter amount exceeds a predetermined threshold value.

According to the computer program of the present invention, the aforementioned first or second optical axis shift correcting apparatus of the present invention can be relatively easily realized as a computer reads and executes the computer program from a program storage device, such as a ROM, a CD-ROM, a DVD-ROM, and a hard disk, or as it executes the computer program after downloading the program through a communication device. By this, as in the aforementioned first or second optical axis shift correcting apparatus of the present invention, it is possible to selectively correct the shift of the optical axis of the light on the surface of the light receiving element with respect to the radial direction of the optical disc, by the relatively simple control.

Incidentally, the optical axis shift correcting method of the present invention can employ the same various aspects as those of the aforementioned first or second optical axis shift correcting apparatus of the present invention.

The above object of the present invention can be also achieved by a computer program product in a computer-readable medium for tangibly embodying a program of instructions executable by a computer provided in the aforementioned first or second optical axis shift correcting apparatus of the present invention (including its various aspects), the computer program product making the computer function as at least one portion of the first or second optical axis shift correcting apparatus (specifically, for example, at least one of the jitter amount obtaining device, the optical axis changing device, and the controlling device).

According to the computer program product of the present invention, the aforementioned first or second optical axis shift correcting apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the aforementioned first or second optical axis shift correcting apparatus of the present invention.

As explained above, according to the first optical axis shift correcting apparatus of the present invention, it is provided with: the jitter amount obtaining device; the optical axis changing device; and the controlling device. According to the second optical axis shift correcting apparatus of the present invention, it is provided with: the recording feature obtaining device; the optical axis changing device; and the controlling device. According to the optical axis shift correcting method of the present invention, it is provided with: the jitter amount obtaining process; the optical axis changing process; and the controlling process. Thus, it is possible to selectively correct the shift of the optical axis of the light on the surface of the light receiving element with respect to the radial direction of the optical disc, without a need to use the information that has been already recorded on the optical disc and by the relatively simple control. Moreover, according to the computer program of the present invention, it makes a computer function as the jitter amount obtaining device, the optical axis changing device, and the controlling device. Thus, it is possible to establish the aforementioned optical axis shift correcting apparatus of the present invention, relatively easily.

These effects and other advantages of the present invention will become more apparent from the embodiments explained below.

BRIEF DESCRIPTION OF DRAWINGS

FIG. 1 is a block diagram conceptually showing the basic structure of an optical information apparatus provided with an optical axis shift correcting apparatus in a first embodiment of the present invention.

FIG. 2 is a schematic conceptual view to explain a relationship between an optical axis shift and an offset of a TE signal.

FIG. 3 is a characteristic diagram to explain a relationship between the optical axis shift and a jitter amount.

FIG. 4 is a characteristic diagram to explain a relationship between a temperature change and the optical axis shift.

FIG. 5 is a flowchart showing operations of the optical axis shift correcting apparatus in the first embodiment.

FIG. 6 is a block diagram conceptually showing the basic structure of an optical information apparatus provided with an optical axis shift correcting apparatus in a second embodiment.

FIG. 7 is a flowchart showing operations of the optical axis shift correcting apparatus in the second embodiment.

FIG. 8 is a flowchart showing operations of an optical axis shift correcting apparatus in a third embodiment.

DESCRIPTION OF REFERENCE CODES 1 optical information apparatus
2 optical disc
21 memory area
10 optical pickup
11 laser light source
111 adhesive portion
12 beam splitter
15 objective lens
16 condenser lens
17 light receiving element
30 TE signal generation device
31 TE offset measurement device
100 control device
181 reproduction signal generation device
182 recording clock generation device
191 reproduction jitter obtaining device
192 recording jitter obtaining device
200 servo control device
201 correction voltage generation circuit
202 driver
203 objective lens driving device

BEST MODE FOR CARRYING OUT THE INVENTION

Hereinafter, the best mode for carrying out the present invention will be explained in each embodiment in order with reference to the drawings.

(1) First Embodiment

An optical axis shift correcting apparatus in a first embodiment will be explained with reference to FIG. 1 to FIG. 5. In the first embodiment, it is judged whether or not an optical axis shift is corrected focusing on a jitter amount of a reproduction signal.

(1-1) Structure

Firstly, the structure of the optical axis shift correcting apparatus in the first embodiment will be explained with reference to FIG. 1 to FIG. 4.

Firstly, with reference to FIG. 1, a description will be given on the basic structure of an optical information apparatus 1 provided with the optical axis shift correcting apparatus in the first embodiment. FIG. 1 is a block diagram conceptually showing the basic structure of the optical information apparatus provided with the optical axis shift correcting apparatus in the first embodiment of the present invention.

As shown in FIG. 1, the optical information apparatus 1 provided with the optical axis shift correcting apparatus in the first embodiment is provided with: an optical pickup 10 including various optical elements which constitute one example of the "optical system"; a laser light source 11 as one example of the "irradiating device"; a light receiving element 17 as one example of the "light receiving element"; a reproduction jitter obtaining device 191 as one example of the "jitter obtaining device"; a control device 100 as one example of the "controlling device", the recording amount detecting device", and the "test-writing device"; a TE signal generation device 30 as one example of the "tracking error signal generating device"; a servo control device 200 as one example of the "servo device"; a temperature detection device 400 as one example of the "temperature detecting device"; a TE offset measurement device 31 as one example of the "shift detecting device"; and a correction voltage generation device 201 as one example of the "light axis changing device". The optical information apparatus 1 is adapted to selectively correct a shift in the optical axis of light on the surface of the light receiving element 17, with respect to the radial direction of an optical disc 2 set in the optical information apparatus 1.

The optical pickup 10 is used to irradiate a laser beam on the optical disc 2 and to record and reproduce the data on the optical disc 2. In order to realize the function, the optical pickup 10 is provided with: the aforementioned laser light source 11; an adhesive portion 111; a beam splitter 12; a collimator lens 13; a quarter wavelength plate 14; an objective lens 15; a condenser lens 16; and the aforementioned light receiving element 17.

The laser light source 11 is one semiconductor laser disposed in the optical pickup 10, or a semiconductor laser selected from a plurality of semiconductor lasers disposed in the optical pickup 10 in accordance with the type of the optical disc, such as a BD for blue laser, a DVD for red laser, and a CD for infrared laser.

The adhesive portion 111 includes an adhesive for bonding or fixing the aforementioned one or plurality of laser light sources 11 in the optical pickup 10. The adhesive portion 111 changes in shape or the like depending on a state change, such as a temperature change, in the actual usage, so that each member of the optical system deforms to be a greater or lesser degree. The laser light source 11, however, may be fixed on a frame or a case or the like of the optical pickup 10 by a mechanical joining device except an adhesive, such as screwing, riveting, hooking, and engagement. In particular, if the plurality of laser light sources 11 are used, one or a plurality of light sources may be fixed by the mechanical joining device, and the remaining one or plurality of light sources may be fixed by the adhesive.

The beam splitter 12 is cube-shaped, obtained by combining two rectangular prisms with their inclined surfaces having appropriate dielectric multilayer films. The beam splitter 12 is adapted to transmit the laser beam irradiated from the laser light source 11 through the beam splitter 12 itself, guide it to the optical disc 2, reflect the laser beam reflected by the optical disc 2, and guide it to the light receiving element 17. The collimator lens 13 makes the irradiated laser beam substantially parallel. and makes it enter the quarter wavelength plate 14. The quarter wavelength plate 14 includes, for example, a birefringent crystal and provides the incoming laser beam and the outgoing laser beam with a phase difference of $\pi/2$ (90 degrees) corresponding to a quarter wavelength. The objective lens 15 is set to condense the incoming laser beam and to focus on the recording layer of the optical disc 2. The condenser lens 16 is set to be reflected by the optical disc 2 and to focus the laser beam entering through the beam splitter 12 on the light receiving element 17.

The light receiving element 17 is adapted to receive the laser beam that is condensed by the condenser lens 16 after being reflected on the recording surface of the optical disc 2, or the light from the optical disc 2 caused by the laser beam. The light receiving element 17 has a relatively high light receiving sensitivity in receiving light near the center of its light receiving surface, leading to high-quality signal reproduction. If the light receiving element 17 is a four-divisional light receiving element (refer to FIG. 2), it has a high sensitivity in receiving light at the center where the four corners of the light receiving elements portions meet each other. Thus, in the ideal irradiation state of the laser beam on the optical disc 2, the light is assumed to be received at the center of the light receiving surface. That is, the optical axis of the light received on the light receiving element 17 is assumed to be at the center of the light receiving element, and under this assumption, a tracking error signal or the like described later is generated. However, in reality, the optical axis of the light received on the light receiving element 17 in the optical system as constructed above often deviates from an ideal position on the surface of the light receiving element 17, depending on usage environment, such as variation in manufacturing and temperature. This is referred to as an "optical axis shift" (or a "shift of the optical axis" or simply a "shift").

The reproduction signal generation device 181 includes, for example, an arithmetic apparatus, a control apparatus, a logic circuit, a memory element, and the like. For example, the reproduction signal generation device 181 generates a regeneration signal related to the record track, on the basis of the light received on the light receiving element 17 electrically connected. Here, the reproduction signal is, for example, an information signal (i.e. RE signal) recorded in a recording area 21 of the optical disc 2. The reproduction signal is obtained anytime in the reproduction, and in stopping the recording on a timely basis to open tracking in the recording. Incidentally, the reproduction signal does not have to be generated if the unrecorded optical disc 2 is used to correct the optical axis.

The reproduction jitter obtaining device 191 includes, for example, an arithmetic apparatus, a control apparatus, a logic circuit, a memory element, and the like. The reproduction jitter obtaining device 191 is adapted to receive the reproduction signal reproduced by the reproduction signal generation device 181 electrically connected and to measure its jitter amount. Incidentally, the reproduction jitter obtaining device 191 may be adapted to obtain a recording quality evaluation parameter (e.g. asymmetry or degree of modulation) for evaluating the quality of the reproduction signal, in addition to or instead of obtaining the jitter amount of the reproduction signal from the reproduction signal. By virtue of such construction, if the recording quality is not within a predetermined range on the basis of the recording quality evaluation parameter, the recording power determined by test-writing can be corrected, as occasion demands, in addition to or instead of the optical shift. Moreover, the reproduction jitter obtaining device 191 may be treated as one example of the "recording feature obtaining device" of the present invention, and the aforementioned recording quality evaluation parameter may be obtained as a recording feature parameter which indicates the recording feature of the signal obtained on the basis of the received light.

In particular in the embodiment, the reproduction signal generation device 181 and the reproduction jitter obtaining device 191 are constructed and functions as one example of the "jitter obtaining device" of the present invention.

The TE signal generation device 30 generates a TE signal related to the recording track, on the basis of the light received on the light receiving element 17. For example, in case of the four-divisional light receiving element 17, the tracking error signal is generated as a push-pull signal. The four-divisional light receiving element 17 will be described later by using FIG. 2.

The servo control device 200 is adapted to send a control signal to the driver 202 to adjust the objective lens 15 in order to correctly trace the recording track carved on the optical disc 2, on the basis of the TE signal generated by the TE signal generation device 30. Moreover, the servo control device 200 is adapted to set the tracking of the laser beam irradiated on the recording track, in an open state or in a close state.

The TE offset measurement device 31 includes, for example, a CPU, a memory, and the like. The TE offset measurement device 31 is adapted to measure the offset amount of the TE signal generated by the TE signal generation device 30 and to transmit the measured offset amount to the control device 100 as offset amount information (or offset amount data) or an offset amount signal which indicates the measured offset amount. The concept on the offset amount measurement will be described later by using FIG. 2.

The control device 100 includes, for example, a CPU, a memory, and the like, and is constructed and functions as one example of the "controlling device", the "recording amount detecting device", and the "test-writing device" of the present invention. The control device 100 firstly, as one example of the "controlling device", controls the correction voltage generation device 201 to reduce the shift, in accordance with the jitter amount of the reproduction signal obtained by the reproduction jitter obtaining device electrically connected, for example. Specifically, if the jitter amount of the reproduction signal obtained is greater than or equal to a predetermined threshold value, the control device 100 detects the optical axis shift of the light on the surface of the light receiving element 17 with respect to the radial direction of the set or loaded optical disc 2 on the basis of the offset amount of the TE signal transmitted, and calculates a correction voltage to relatively reduce the detected optical axis shift (i.e. the offset amount of the TE signal), i.e. for cancelling offset. Moreover, the control device 100, as one example of the "recording amount detecting device", may be adapted to detect the data amount of the record data to be written onto the optical disc 2 in the recording onto the optical disc 2. The data amount may be detected later from the written record data, or may be detected in advance from the control content in irradiating the laser for recording. Moreover, the shift of the optical axis can be detected as the offset amount of the TE signal, as occasion demands, in accordance with a temperature change monitored by the temperature detection device 400. Moreover, the control device 100, as one example of the "test-writing device", may control the laser light source 11 to irradiate the laser beam on the optical disc 2 as test-writing, obtain a result of the test-writing as actual recording power information, and determine the recording power of the irradiated laser beam on the basis of the obtained actual recording power information. By virtue of such construction, if the recording quality after the correction of the shift of the optical axis is not within a predetermined range, the determined recording power will be corrected on the basis of the obtained actual recording power information.

The correction voltage generation device 201, the driver 202, and the objective lens driving device 203 are constructed and function as one example of the "optical axis changing device" of the present invention. The correction voltage generation device 201 is adapted to generate the correction voltage calculated on the control device 100, for example. Alternatively, the correction voltage generation device 201 corrects the control signal transmitted from the servo control device 200 to the driver 200 so that the driver 202 generates a control voltage to which the calculated correction voltage is added. The driver 202 receives the control signal from the servo control device 200 and generates the control voltage for operating the objective lens driving device 203. At this time, the previous correction voltage is added to the control voltage for the objective lens driving device 203, to thereby relatively reduce the offset amount of the TE signal in the driver 202. Here, the objective lens driving device 203 is electrically connected to the driver 202, and is adapted to receive the control voltage corrected by the correction voltage generation device 201 from the driver 202 and to drive the objective lens 15. As a result, the objective lens driving device 203 changes the direction of the optical axis with respect to the light receiving element so as to reduce the shift of the optical axis. Incidentally, the objective lens driving device 203 is used not only for the optical axis shift correction in the embodiment but also for the control, such as normal tracking control and focus control.

The slider 300 is adapted to displace one portion or entire portion of the optical pickup 2 in the radial direction of the optical disc 2. The LPF 301 is a low pass filter which can extract a DC component of the control signal of the servo control device 200. The driver 302 is adapted to generate the control voltage for operating the slider driving device 303, on the basis of the extracted DC component of the control signal of the servo control device 200. The slider driving device 303 is mechanically or electromagnetically connected to the slider 303 and is adapted to drive at least one portion of the slider 300.

In particular in the embodiment, the temperature detection device 400 is disposed, for example, in the optical pickup 10, and may directly measure the temperature of the optical system of the optical pickup 10 or the like (desirably, a portion relatively weak to the temperature change, such as the adhesive portion 111) or may directly detect it through another temperature sensor or a parameter having a particular relationship with another temperature. If the temperature detected in this manner changes a predetermined temperature width or more, the shift of the optical axis is detected by the TE offset measurement device 31 or the like.

The optical disc 2 is, for example, a CD, a DVD, a Blu-ray Disc, or a HD-DVD, on which the recording or reproduction is performed by the optical information apparatus 1. The optical disc 2 has the recording area 21 occupied in the most part, and the information is recorded into the recording area 21. Moreover, the optical disc 2 includes, for example, a lead-in area and a control area on the inner circumferential side of the recording area 21. Moreover, when the optical axis shift is detected by the optical axis shift correcting apparatus as described later, the detection may be performed near the inner circumference of the recording area 21 or on the inner side thereof, considering that coma aberration has a smaller effect on the offset of the TE signal than near the outer circumference because of warpage of the optical disc 2 or the like.

Next, using FIG. 2, a description will be given on a relationship between the optical axis shift and the offset of the TE signal. FIG. 2 is a schematic conceptual view to explain the relationship between the optical axis shift and the offset of the TE signal.

In FIG. 2, the square in the upper part indicates the light receiving surface of the light receiving element 17, and the light receiving element 17 is divided into four areas of an area A, an area B, an area C, and an area D. Moreover, the substantial circular form in a dashed line on the light receiving surface of the light receiving element 17 indicates the received light, and the center of the substantial circular form indicates the optical axis. Moreover, a horizontal direction indicates a direction corresponding optically to the radial direction (i.e. the radial direction of the optical disc 2), and a vertical direction indicates a direction corresponding optically to the tangential direction (i.e. the direction of tangent of the optical disc 2) of the optical disc 2. Moreover, the TE signal based on a result of the detection of the light received in each of the divided areas is generated by the TE signal generation device 30, as (a light detection result in the area A+ a light detection result in the area C−(a light detection result in the area B+ a light detection result in the area D).

Moreover, in FIG. 2, the TE signal generated in accordance with the position of the optical axis shown in the upper part is shown as the waveform chart in the lower part. In the waveform chart, the horizontal axis indicates a time axis, the vertical axis indicates the intensity of the TE signal, a reference voltage Vref of the servo indicates a voltage that is a reference of the servo, and a center voltage TEofst indicates a voltage that is the center of a TE signal amplitude.

In the upper part of FIG. 2, in case of (a) where the "center voltage TEofst=Vref", the optical axis of the received light is located at substantially the center of the light receiving element 17 on the light receiving surface of the light receiving element 17. This is the most desirable state in terms of a light receiving performance, and the center voltage TEofst of the TE signal amplitude in this state substantially matches the reference voltage Vref of the servo, as shown in association with the lower part of FIG. 2.

On the other hand, in the upper part of FIG. 2, in case of (b) where the "center voltage TEofst<Vref", or in case of (c) where the "center voltage TEofst>Vref", the optical axis of the received light deviates from the center of the light receiving element 17.

Specifically, in FIG. 2, in case of (b), as shown in the upper part of FIG. 2, the optical axis of the received light deviates from the center of the light receiving element 17 toward the outer circumference in the radial direction. Thus, (the light detection result in the area A+the light detection result in the area C) becomes less than (the light detection result in the area B+ the light detection result in the area D), and the center voltage TEofst of the TE signal amplitude is relatively less than the reference voltage Tref of the servo, as shown in the lower part of FIG. 2.

Moreover, in FIG. 2, in case of (c), the optical axis of the received light deviates from the center of the light receiving element 17 toward the inner circumference in the radial direction. Thus, (the light detection result in the area A+ the light detection result in the area C) becomes greater than (the light detection result in the area B+ the light detection result in the area D), and the center voltage TEofst of the TE signal amplitude is relatively greater than the reference voltage Tref of the servo, as shown in the lower part of FIG. 2.

As described above, by comparing the difference between the center voltage TEofst of the TE signal amplitude and the reference voltage Vref of the servo (i.e. the "offset amount of the tracking error signal" of the present invention), it is possible to quantitatively measure how much the optical axis deviates toward the inner circumference or the outer circumference in the radial direction of the optical disc 2. Using the relevant feature, the optical axis shift can be relatively reduced by reducing the difference between the center voltage TEofst of the TE signal amplitude and the reference voltage Vref of the servo. Specifically, the TE offset measurement device 13 measures the difference between the center voltage TEofst of the TE signal amplitude and the reference voltage Vref of the servo, and the objective lens 15 is adjusted in the radial direction of the optical disc 2 to reduce the difference. By this, it is possible to preferably correct the optical axis shift in the radial direction.

Next, by using FIG. 3, a description will be given on a relationship between the optical axis shift and the jitter amount. FIG. 3 is a characteristic diagram to explain the relationship between the optical axis shift and the jitter amount. The horizontal axis in FIG. 3 indicates the optical axis shift [%] in the radial direction of the optical disc 2, and the vertical axis in FIG. 3 indicates the jitter amount [%] of the signal (e.g. the reproduction signal or recording clock) obtained on the basis of the received light in the presence of the optical axis shift.

As described above, according to FIG. 3, it can be seen that as the optical axis shift increases more in the radial direction of the optical disc 2, the jitter amount of the reproduction signal obtained on the basis of the received light in the presence of the optical axis shift also increases. In other words, the light receiving sensitivity relatively improves if the optical axis relatively comes closer to the center of the surface of the light receiving element. Thus, by obtaining the relationship between the optical axis shift and the jitter amount in advance by experiments or by simulations, a "predetermined threshold value", which is a threshold value for defining a condition to correct the optical axis shift, is determined in advance for each type or each individual of the optical information apparatus so as to always satisfy performances and apparatus specification required for the actual optical information apparatus 1. The "predetermined threshold value" is determined by an allowable value of the optical axis shift. Specifically, for example, in FIG. 3, if the allowable value of the optical axis shift is 40%, the predetermined threshold value may be 9.5%. In this case, if the jitter of the reproduction signal becomes greater than or equal to 9.5%, the optical axis shift is corrected. As described above, the optical axis shift is selectively corrected by using the relationship between the optical axis shift and the jitter.

Incidentally, FIG. 3 shows one example of the relationship between the optical axis shift and the jitter amount, and it is not intended to ensure the scale of each of the vertical axis and the horizontal axis. Moreover, obviously in some cases, the relationship between the optical axis shift and the jitter amount of the recording clock has a different rate of change or the like although it has the same basic characteristic (specifically the characteristic that "as the optical axis shift increases, the jitter amount increases"), compared to the relationship between the optical axis shift and the jitter amount of the reproduction signal. Therefore, the "predetermined threshold value" related to the reproduction signal in the embodiment, the "predetermined threshold value" related to the recording clock in a second embodiment, and the "predetermined threshold value" related to the recording clock in a third embodiment are individually derived from the relationship between the optical axis shift and the reproduction signal or the recording clock, so that the values may be different.

Moreover, by using FIG. 4, a description will be given on a relationship between the temperature change and the optical axis shift. FIG. 4 is a characteristic diagram to explain the relationship between the temperature change and the optical axis shift. The horizontal axis in FIG. 4 indicates the temperature [° C.] of the optical pickup 10 detected by the temperature detection device 400, and the vertical axis in FIG. 4 indicates the optical axis shift [%] occurring under this temperature.

As described above, according to FIG. 4, it can be seen that a change in the temperature of the optical pickup 10 changes the occurring optical axis shift. More specifically, in this example, if the temperature is about 20 degrees Celsius, the optical axis shift is 0%. Thus, it can be said that this temperature is ideal; however, it can be seen that the optical axis shift increases, whether the temperature increases or decreases from 20 degrees Celsius. In other words, each of the optical elements (the laser light source 11, the beam splitter 12, and the like), which constitute the optical system in the optical pickup, is relatively positioned under the premise that the temperature in the usage is 20 degrees Celsius. Thus, for example, if the temperature is 20 degrees Celsius before using the optical information apparatus 1 and it is judged that the optical axis shift does not have to be corrected, or even if the optical axis shift is corrected only once immediately after using the optical information apparatus 1, there is such a possibility that the temperature of the optical system increases with the use of the optical information apparatus 1 and that the optical axis shift relatively increases. That is, the shift of the optical axis easily occurs with respect to the temperature change in the optical system.

In the embodiment, however, by obtaining the relationship between the temperature change and the optical axis shift in advance by experiments or by simulations, a "predetermined temperature width", which is a threshold value for defining timing to correct the optical axis shift again and which will be detailed later in the explanation on the operation in the first embodiment, is determined in advance for each type or each individual of the optical information apparatus so as to always satisfy performances and apparatus specification required for the actual optical information apparatus 1. Therefore, regardless of how the temperature changes in the usage, the optical axis shift caused by the temperature change is corrected on a timely basis.

In addition, since the temperature and the optical axis shift are in a substantially linear relationship, as shown in FIG. 4, the shift in accordance with the temperature can be sequentially corrected by using a constant of proportion that indicates the substantially linear relationship, or by using the amount of the optical axis shift as such a temperature function. At this time, a multiplier of proportion may be held in a built-in or external memory of the optical axis shift correcting apparatus. In particular, as shown in FIG. 4, if the temperature and the optical axis shift are not in the substantially linear relationship, the relationship between the temperature and the optical axis shift, or the relationship between the temperature and the correction voltage may be held in a built-in or external memory of the optical axis shift correcting apparatus, as a comparison table, a table, a list, and the like. Moreover, the constant of proportion or the relationship may be corrected in a heuristic manner, as occasion demands, in the actual usage.

Moreover, in the same optical pickup 10, the shift of the optical axis and the temperature change or the like may be in a reversible relationship in some cases. For example, in some cases the shift amount of the optical axis is −30% when the temperature increases from 30 to 50 degrees Celsius. On the other hand, in some cases the shift amount of the optical axis is nearly +30% when the temperature reduces from 50 to 30 degrees Celsius. By using this, the control device 100 can estimate the shift amount of the optical axis when the temperature reduces, using the shift amount of the optical axis when the temperature increases, and can correct the shift.

Incidentally, FIG. 4 shows one example of the relationship between the temperature change and the optical axis shift, and it is not intended to ensure the temperature at which the optical axis shift is 0%, the constant of proportion, or the linearity.

(1-2) Operation

Next, the operation in the embodiment as constructed above will be explained by using FIG. 5 in addition to FIG. 1 to FIG. 4. Incidentally, in FIG. 5, the step that indicates the same processing content carries the same numerical reference, and the detailed explanation thereof will be omitted, as occasion demands.

In FIG. 5, firstly, in the recording of the optical information apparatus 1, it is judged whether or not the recording is ready, such as a user's setting the optical disc 2, such as a DVD for blue laser, a DVD for red laser, and a CD, on the optical information apparatus 1 (step S1010). If the recording is not ready (the step S1010: NO), the subsequent process is not performed yet. On the other hand, if the recording is ready (the step S1010: YES), then the subsequent process will be performed.

Here, before the recording start and the test-writing, the optical axis shift is corrected (step S1020). The correction of the optical axis shift is realized, specifically, for example, by that the TE signal generation device 30 generates the TE signal related to the recording track on the basis of the light received on the light receiving element 17, by that the TE offset measurement device 31 measures the offset of the generated TE signal, by that the control device 100 controls the correction voltage generation device 201 to generate the correction voltage for reducing the measured offset (i.e. a guide for quantitatively detecting the optical axis shift), and by that the driver 202 is driven to send the control voltage to which the correction voltage is added, to the objective lens driving device 203. For example, in this manner, the optical axis shift is corrected and reduced, by which the recording quality is improved between when the recording is started in a step S1040 and when the recording is stopped for the first time in a step S1071.

After that, the test-writing is performed by the control device 100, and the actual recording power information is obtained and the recording power of the laser beam used in the recording is determined (step S1030). At this time, since the optical axis shift is corrected in the previous step S1020, it is also expected to improve the power correction accuracy of the test-writing.

Then, the recording is started by the optical information apparatus 1 (step S1040). That is, information is written into the recording area 21 of the optical disc 2 by the laser beam irradiated from the laser light source 11. Here, it is judged whether or not the recording is ended regularly or irregularly (step S1050). At this time, if the recording is ended (the step S1050: YES), the operation in the embodiment will be ended.

On the other hand, if the recording is not ended (the step S1050: NO), as a guide for judging whether or not the recording needs to be stopped (refer to FIG. 4), it is judged whether or not the temperature detected by the temperature detection device 400 has changed by a predetermined temperature width or more, or whether or not the data has changed by a predetermined data width (i.e. the data has been written by the predetermined data width or more) with respect to the optical disc 2 (step S1061). Here, if the temperature detected by the temperature detection device 400 has not changed by the predetermined temperature width or more, or if the data has not been written by the predetermined data width or more with respect to the optical disc 2 (the step S1061: NO), it is considered that the recording does not have to be stopped, and the recording is continued.

On the other hand, if the temperature detected by the temperature detection device 400 has changed by the predetermined temperature width or more, or if the data has been written by the predetermined data width or more with respect to the optical disc 2 (the step S1061: YES), the recording is temporarily stopped (step S1071).

Then, as a guide for judging whether or not the optical axis shift is corrected again, it is judged whether or not the jitter amount of the reproduction signal obtained by the reproduction jitter obtaining device 191 is greater than or equal to a predetermined threshold value (refer to FIG. 3) (step S1081). Here, if the jitter amount of the reproduction signal is not greater than or equal to the predetermined threshold value (the step S1081: NO), it is considered that the optical axis shift does not have to be corrected again yet, and the recording is restarted.

On the other hand, if the jitter amount of the reproduction signal is greater than or equal to the predetermined threshold value (the step S1081: YES), the optical axis shift is corrected again (step S1020).

After that, the recorded portion is reproduced (step S1101), and it is judged whether or not the recording quality at that time is within a predetermined range (step S1111). Here, if the recording quality is not within the predetermined range (the step S1111: NO), the recording power is corrected from the actual recording power information obtained by the test-writing in the step S1030 (step S1112). On the other hand, if the recording quality is within the predetermined range (the step S1111: YES), it means that the optical axis shift is preferably corrected, and the recording is restarted.

Incidentally, in judging whether or not to correct the optical axis shift, if it is redundant to perform not only the judgment process in the step S1061 but also the judgment process in the step S1081, the judgment process in the step S1081 may be included, for example, in the judgment process in the step S1111. That is because the embodiment does not intend to cause the judgment process for controlling the number of corrections of the optical axis shift to become a load that is greater than the controlled number of corrections of the optical axis shift.

As explained above with reference to FIG. 1 to FIG. 5, according to the first embodiment, it is possible to selectively correct the shift of the optical axis of the light on the surface of the light receiving element 17 with respect to the radial direction of the optical disc 2, by the relatively simple control. In particular, according to the first embodiment, by correcting the optical axis shift before the recording start and the test-writing, the recording quality until the recording is stopped for the first time and the power correction accuracy of the test-writing are also improved. Moreover, it is also possible to know the extent of the optical axis shift indirectly on the basis of the temperature change, the recorded data, and the jitter amount of the reproduction signal, so that it is possible to control the number of corrections of the optical axis shift as much as possible. That is, the optical axis shift can be selectively corrected, so that it is extremely useful in practice.

(2) Second Embodiment

An optical axis shift correcting apparatus in a second embodiment will be explained with reference to FIG. 6 and FIG. 7 in addition to FIG. 1 to FIG. 5. In the second embodiment, it is judged whether or not an optical axis shift is corrected focusing on a jitter amount of a recording clock.

(2-1) Structure

Firstly, with reference to FIG. 6, a description will be given on the basic structure of the optical information apparatus in the second embodiment. Incidentally, in FIG. 6, the same structure as that in FIG. 1 carries the same numerical reference, and the detailed explanation thereof will be omitted.

In the structure in FIG. 6 in the embodiment, the point that is different from the structure in FIG. 1 in the first embodiment is that it is provided with a recording clock generation device 182 in addition to or instead of the reproduction signal generation device 181 in FIG. 1 and that it is further provided with a recording jitter obtaining device 192 in addition to or instead of the reproduction jitter obtaining device 191 in FIG. 1. The other structure is the same as that in the case of FIG. 1.

The recording clock generation device 182 includes, for example, an arithmetic apparatus, a control apparatus, a logic circuit, a memory element, and the like. The recording clock generation device 182 is adapted to generate a jitter amount of a recording clock, on the basis of the light received on the light receiving element 17.

The recording jitter obtaining device 192 includes, for example, an arithmetic apparatus, a control apparatus, a logic circuit, a memory element, and the like. The recording jitter obtaining device 192 is adapted to obtain the jitter amount of the recording clock by analyzing the recording clock generated by the recording clock generation device 182 electrically connected.

(2-2) Operation

Next, the operation of the optical axis shift correcting apparatus in the embodiment as constructed above will be explained by using FIG. 7. Incidentally, in FIG. 7, the same step as that in FIG. 5 carries the same numerical reference, and the detailed explanation thereof will be omitted, as occasion demands. In the processes in FIG. 7 in the embodiment, the point that is different from the processes in FIG. 5 in the first embodiment is that a judgment process in a step S2061 in FIG. 7 is performed in addition to or instead of the judgment processes in the step S1061 and the step S1081 in FIG. 5, and the other processes are the same as those in the case of FIG. 5.

Even in FIG. 7, firstly, in the recording of the optical information apparatus 1, if the recording is ready (the step S1010: YES), before the recording start and the test-writing, the optical axis shift is corrected (the step S1020). After that, the test-writing is performed by the control device 100, and the actual recording power information is obtained and the recording power of the laser beam used in the recording is determined (the step S1030). Then, the recording is started by the optical information apparatus 1 (the step S1040).

In particular, in the embodiment, if the recording is not ended (the step S1050: NO), as a guide for judging whether or not the recording needs to be stopped, it is judged whether or not the jitter amount of the recording clock is greater than or equal to a predetermined threshold value (refer to FIG. 3) (step S2061). Here, the jitter amount of the recording clock is obtained by that the recording jitter obtaining device 192 analyzes the jitter amount of the recording clock generated by the recording clock generation device 172 on the basis of the light received on the light receiving element 17. Here, if the jitter amount of the recording clock is not greater than or equal to the predetermined threshold value (the step S2061: NO), it is considered that the recording does not have to be stopped, and the recording is continued.

On the other hand, if the jitter amount of the recording clock is greater than or equal to the predetermined threshold value (the step S2061: YES), there is a possibility that the optical axis shift occurs to the extent that it cannot be ignored, so that the recording is temporarily stopped (the step S1071).

Then, as in FIG. 5, the optical axis shift is corrected again (the step S1020). After that, the recorded portion is reproduced (the step S1101), and it is judged whether or not the recording quality at that time is within a predetermined range (the step S1111). Here, if the recording quality is not within the predetermined range (the step S1111: NO), the recording power is corrected from the actual recording power information obtained by the test-writing in the step S1030 (the step S1112). On the other hand, if the recording quality is within the predetermined range (the step S1111: YES), it means that the optical axis shift is preferably corrected, and the recording is restarted.

As explained above with reference to FIG. 6 and FIG. 7, particularly according to the second embodiment, since the jitter amount of the recording clock is focused on, it is possible to judge whether or not to correct the optical axis shift before the recording is stopped. Therefore, if the optical axis shift does not have to be corrected, the recording can be continued without stopping the recording, which increases recording efficiency while maintaining the constant recording quality, so that it is extremely useful in practice.

(3) Third Embodiment

An optical axis shift correcting apparatus in a third embodiment will be explained with reference to FIG. 8 in addition to FIG. 1 to FIG. 7. In the third embodiment, the optical axis shift is corrected without stopping the recording, focusing on the jitter amount of the recording clock.

(3-1) Structure

The basic structure of the optical information apparatus provided with the optical axis shift correcting apparatus in the embodiment may be the same as that in the second embodiment. The explanation will be omitted to avoid redundancy. That is, the basic structure in the embodiment is as shown in FIG. 6.

(3-2) Operation

Next, the operation of the optical axis shift correcting apparatus in the embodiment will be explained by using FIG. 8. Incidentally, in FIG. 8, the same step as that in FIG. 5 and FIG. 7 carries the same numerical reference, and the detailed explanation thereof will be omitted, as occasion demands. In the processes in FIG. 8 in the embodiment, the point that is different from the processes in FIG. 7 in the second embodiment is that the optical axis shift is corrected without temporarily stopping the recording as shown in the step S1071 in FIG. 7, and the other processes are the same as those in the case of FIG. 7.

Even in FIG. 8, firstly, in the recording of the optical information apparatus 1, if the recording is ready (the step S1010: YES), before the recording start and the test-writing, the optical axis shift is corrected (the step S1020). After that, the test-writing is performed by the control device 100, and the actual recording power information is obtained and the recording power of the laser beam used in the recording is determined (the step S1030). Then, the recording is started by the optical information apparatus 1 (the step S1040).

Here, if the recording is not ended (the step S1050: NO), as a guide for judging whether or not the recording needs to be stopped, it is judged whether or not the jitter amount of the recording clock is greater than or equal to a predetermined threshold value (refer to FIG. 3) (the step S2061). Here, the jitter amount of the recording clock is obtained by that the recording jitter obtaining device 192 analyzes the jitter amount of the recording clock generated by the recording clock generation device 172 on the basis of the light received on the light receiving element 17. Here, if the jitter amount of the recording clock is not greater than or equal to the predetermined threshold value (the step S2061: NO), it is considered that the recording does not have to be stopped, and the recording is continued.

On the other hand, if the jitter amount of the recording clock is greater than or equal to the predetermined threshold value (the step S2061: YES), there is a possibility that the optical axis shift occurs to the extent that it cannot be ignored. In the embodiment, particularly in this case, the optical axis shift is corrected again without stopping the recording (the step S1020). That is because the jitter of the recording clock can be obtained without stopping the recording.

On the basis of the jitter amount of the recording clock, it is judged whether or not the correction of the optical axis shift performed in this manner is proper, namely, whether or not the direction of the optical axis to be changed to reduce the optical axis shift is proper (step S3111). Specifically, compared to before the correction of the optical axis shift, it is judged whether or not the jitter amount of the recording clock is reduced. Here, if the jitter amount of the recording clock is reduced (the step S3111: YES), the correction of the topical axis shift is considered to be proper, and then the optical axis shift is corrected until the jitter amount of the recording clock becomes below a predetermined threshold value in a feedback manner. On the other hand, if the jitter amount of the recording clock is not reduced (the step S3111: NO), it is considered that it is not proper to correct the optical axis shift any longer, and the recording is stopped.

As explained above with reference to FIG. 6 and FIG. 8, particularly according to the third embodiment, since the jitter amount of the recording clock is focused on, it is possible to judge whether or not to correct the optical axis shift before stopping the recording. In addition, since the optical axis shift can be corrected without stopping the recording, the recording efficiency is improved while maintaining the constant recording quality, so that it is extremely useful in practice.

Incidentally, in the embodiment, the optical axis shift is corrected without stopping the recording. Thus, the predetermined threshold value in the embodiment needs to be more severe than the predetermined threshold value in the second embodiment. Specifically, if the predetermined threshold value in the second embodiment corresponds to a jitter amount 10% of the reproduction signal, the predetermined threshold value in the embodiment is desirably set to correspond to a jitter amount 9% of the reproduction signal. At this time, in the event that the jitter amount of the recording clock exceeds the jitter amount 9% of the reproduction signal during the processes in the embodiment, the recording may be stopped to switch over to the processes in the second embodiment or the first embodiment.

As described above, according to the embodiment, in the optical information apparatus 1, the optical axis shift correcting apparatus is provided with the TE offset measurement device 31 and the control device 100 in addition to the reproduction jitter obtaining device 191 or the recording jitter obtaining device 192, so that it is possible to selectively correct the shift of the optical axis of the laser beam in the radial direction of the optical disc 2, in the relatively simple processes.

Incidentally, the present invention is not limited to the aforementioned embodiment, but various changes may be made, if desired, without departing from the essence or spirit of the invention which can be read from the claims and the entire specification. An optical axis shift correction apparatus and method, and a computer program, all of which involve such changes, are also intended to be within the technical scope of the present invention.

INDUSTRIAL APPLICABILITY

The optical axis shift correction apparatus and method, and the computer program according to the present invention can be applied to a high-density optical disc, such as a DVD and a BD, and can be further applied to an information recording apparatus, such as a DVD recorder. Moreover, they can be applied to an information recording apparatus or the like which is mounted on various computer equipment for consumer use or for commercial use, or which can be connected to various computer equipment.

The invention claimed is:

1. An optical axis shift correcting apparatus for correcting a shift of an optical axis of light on a surface of a light receiving element with respect to a radial direction of an optical disc set on an optical information apparatus comprising: an irradiating device for irradiating a laser beam; an optical system for guiding the irradiated laser beam to the optical disc with a recording track; and the light receiving element for receiving, through the optical system, the light from the optical disc caused by the guided laser beam, said optical axis shift correcting apparatus comprising:
a jitter obtaining device for obtaining a jitter amount of a signal obtained on the basis of the received light;
an optical axis changing device for changing a direction of the optical axis with respect to the light receiving element; and
a controlling device for controlling said optical axis changing device to reduce the shift if the obtained jitter amount exceeds a predetermined threshold value.

2. The optical axis shift correcting apparatus according to claim 1, wherein
the signal obtained on the basis of the received light is a reproduction signal obtained by reproducing information recorded on the optical disc, and
said controlling device controls said optical axis changing device to reduce the shift if the jitter amount related to the obtained reproduction signal exceeds the predetermined threshold value.

3. The optical axis shift correcting apparatus according to claim 1, wherein
the signal obtained on the basis of the received light is a recording clock used for the recording with respect to the optical disc, and
said controlling device controls said optical axis changing device to reduce the shift if the jitter amount related to the obtained recording clock exceeds the predetermined threshold value.

4. The optical axis shift correcting apparatus according to claim 3, wherein said controlling device controls said optical axis changing device to reduce the shift without stopping the recording if the jitter amount related to the obtained recording clock exceeds the predetermined threshold value.

5. The optical axis shift correcting apparatus according to claim 1, wherein
the optical information apparatus further comprises a tracking error signal generating device for generating a tracking error signal related to the recording track, on the basis of the received light,
said optical axis shift correcting apparatus further comprises a shift detecting device for detecting the shift on the basis of an offset amount of the tracking error signal, and
said controlling device controls said optical axis changing device to reduce the detected shift.

6. The optical axis shift correcting apparatus according to claim 5, wherein said controlling device controls said optical axis changing device to reduce the detected shift before the recording with respect to the optical disc.

7. The optical axis shift correcting apparatus according to claim 1, wherein said optical axis shift correcting apparatus further comprises a temperature detecting device for detecting a temperature of the optical system, and said controlling device controls said optical axis changing device to reduce the shift if the obtained jitter amount exceeds the predetermined threshold value and/or if the detected temperature changes by a predetermined temperature width or more.

8. The optical axis shift correcting apparatus according to claim 1, wherein said optical axis shift correcting apparatus further comprises a recording amount detecting device for detecting a data amount of record data written onto the optical disc in the recording with respect to the optical disc, and said controlling device controls said optical axis changing device to reduce the shift if the obtained jitter amount exceeds the predetermined threshold value and/or if the detected data amount is written by a predetermined data width or more.

9. The optical axis shift correcting apparatus according to claim 1, wherein the optical information apparatus further comprises a test-writing device for controlling the irradiating device to irradiate the laser beam as test-writing on the optical disc before the recording with respect to the optical disc, for obtaining a result of the test-writing as actual recording power information, and for determining a recording power of the irradiated laser beam on the basis of the obtained actual recording power information, and said controlling device corrects the determined recording power on the basis of the obtained actual recording power information if recording quality when controlling said optical axis changing device is not within a predetermined range.

10. The optical axis shift correcting apparatus according to claim 9, wherein said controlling device controls said optical axis changing device to reduce the shift before the test-writing.

11. The optical axis shift correcting apparatus according to claim 1, wherein the optical information apparatus further comprises a servo device for performing tracking servo of the laser beam for the recording track, and said controlling device controls said optical axis changing device to reduce the shift in such a state that the tracking servo is open.

12. An optical axis shift correcting method for correcting a shift of an optical axis of light on a surface of a light receiving element with respect to a radial direction of an optical disc set on an optical information apparatus comprising: an irradiating device for irradiating a laser beam; an optical system for guiding the irradiated laser beam to the optical disc with a recording track; and the light receiving element for receiving, through the optical system, the light from the optical disc caused by the guided laser beam, said optical axis shift correcting method comprising:

a jitter obtaining process of obtaining a jitter amount of a signal obtained on the basis of the received light; and an optical axis changing process of changing a direction of the optical axis with respect to the light receiving element to reduce the shift if the obtained jitter amount exceeds a predetermined threshold value.

* * * * *